(12) United States Patent
Du et al.

(10) Patent No.: US 12,019,869 B2
(45) Date of Patent: Jun. 25, 2024

(54) METHOD, ELECTRONIC DEVICE, AND COMPUTER PROGRAM PRODUCT FOR SCHEDULING DATA COLLECTION

(71) Applicant: Dell Products L.P., Round Rock, TX (US)

(72) Inventors: Fang Du, Guangyuan (CN); Weilan Pu, Chengdu (CN); Peilei Chen, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 81 days.

(21) Appl. No.: 17/978,716

(22) Filed: Nov. 1, 2022

(65) Prior Publication Data

US 2024/0126432 A1    Apr. 18, 2024

(30) Foreign Application Priority Data

Oct. 12, 2022   (CN) .......................... 202211249381.8

(51) Int. Cl.
  *G06F 3/06* (2006.01)
(52) U.S. Cl.
  CPC .......... *G06F 3/0604* (2013.01); *G06F 3/0655* (2013.01); *G06F 3/0673* (2013.01)
(58) Field of Classification Search
  CPC ..... G06F 3/0604; G06F 3/0655; G06F 3/0673
  See application file for complete search history.

(56) References Cited

U.S. PATENT DOCUMENTS

| | | | | |
|---|---|---|---|---|
| 2015/0178191 A1* | 6/2015 | Camp | ................. | G06F 12/0246 711/103 |
| 2017/0031715 A1* | 2/2017 | Willis | ...................... | G06F 9/46 |
| 2017/0068982 A1* | 3/2017 | Vangala | ............. | G06Q 30/0224 |
| 2018/0165022 A1* | 6/2018 | Tomic | ................. | G06F 11/1004 |
| 2019/0123986 A1* | 4/2019 | Igarashi | ............. | G05B 19/4185 |
| 2019/0347093 A1* | 11/2019 | Challagolla | ......... | G06F 11/3616 |
| 2021/0132815 A1* | 5/2021 | Jang | ...................... | G06F 3/0608 |
| 2021/0149384 A1* | 5/2021 | Dittmer | ................... | H04L 43/16 |
| 2021/0191967 A1* | 6/2021 | Cosman | ............ | G06F 16/24578 |
| 2021/0216412 A1* | 7/2021 | Navon | .................. | G06F 3/0653 |

OTHER PUBLICATIONS

Dell EMC CloudIQ: a Detailed Review (Year: 2020).*
Dell Technologies, "Dell EMC CloudIQ: a Detailed Review," Technical White Paper, Jun. 2020, 101 pages.
Dell Technologies, "Dell CloudIQ: a Detailed Review," White Paper, H15691.6, Jul. 2022, 172 pages.

\* cited by examiner

*Primary Examiner* — Tasnima Matin
(74) *Attorney, Agent, or Firm* — Ryan, Mason & Lewis, LLP (57) ABSTRACT

Embodiments of the present disclosure provide a method, an electronic device, and a computer program product for scheduling data collection. The method includes acquiring a plurality of running parameters of a storage system. The method further includes determining a plurality of grade ranges of each of the plurality of running parameters, the grade ranges indicating degrees of impact on scheduling for data collection. The method further includes determining a plurality of relevancies of the plurality of running parameters for the plurality of grade ranges. The method further includes determining scheduling for the data collection based on the plurality of relevancies. The method can dynamically determine when to perform data collection, thus avoiding data loss.

20 Claims, 6 Drawing Sheets

METHOD, ELECTRONIC DEVICE, AND COMPUTER PROGRAM PRODUCT FOR SCHEDULING DATA COLLECTION

RELATED APPLICATION(S)

The present application claims priority to Chinese Patent Application No. 202211249381.8, filed Oct. 12, 2022, and entitled "Method, Electronic Device, and Computer Program Product for Scheduling Data Collection," which is incorporated by reference herein in its entirety.

FIELD

Embodiments of the present disclosure relate to the field of computers, and more specifically, to a method, an electronic device, and a computer program product for scheduling data collection.

BACKGROUND

In a storage system, data collection is one of the core tools that reflect the serviceability of a product. Data collection can be used to collect logs, configuration data, system dumps, and other information that is crucial to the ability to diagnose and repair storage system problems. The system data obtained by data collection is widely used to solve storage system problems and analyze system problems. Therefore, a scheduling mechanism for data collection is set in the storage system, so that corresponding data can be provided when the storage system has problems.

SUMMARY

Embodiments of the present disclosure provide techniques for scheduling data collection.

In a first aspect of the present disclosure, a method for scheduling data collection is provided. The method includes acquiring a plurality of running parameters of a storage system. The method includes determining a plurality of grade ranges of each of the plurality of running parameters, the grade ranges indicating adjustment degrees for a predetermined time for performing data collection. The method further includes determining a plurality of relevancies of the plurality of running parameters for the plurality of grade ranges. The method further includes determining scheduling for the data collection based on the plurality of relevancies.

In a second aspect of the present disclosure, an electronic device is provided. The electronic device includes a processor and a memory coupled to the processor. The memory has instructions stored therein, and the instructions, when executed by the processor, cause the device to execute actions. The actions include acquiring a plurality of running parameters of a storage system. The actions include determining a plurality of grade ranges of each of the plurality of running parameters, the grade ranges indicating adjustment degrees for a predetermined time for performing data collection. The actions include determining a plurality of relevancies of the plurality of running parameters for the plurality of grade ranges. The actions include determining scheduling for the data collection based on the plurality of relevancies.

In a third aspect of the present disclosure, a computer program product is provided. The computer program product is tangibly stored on a non-transitory computer-readable medium and includes machine-executable instructions. The machine-executable instructions, when executed by a machine, cause the machine to perform the method according to the first aspect.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

By more detailed description of example embodiments of the present disclosure, provided herein with reference to the accompanying drawings, the above and other objectives, features, and advantages of the present disclosure will become more apparent, where identical reference numerals generally represent identical components in the example embodiments of the present disclosure. In the accompanying drawings.

DETAILED DESCRIPTION

Principles of the present disclosure will be described below with reference to several example embodiments illustrated in the accompanying drawings. Although the drawings show example embodiments of the present disclosure, it should be understood that these embodiments are merely described to enable those skilled in the art to better understand and further implement the present disclosure, and not to limit the scope of the present disclosure in any way.

The term "include" and variants thereof used in this text indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As discussed above, in order to collect data for system problem analysis, the following three kinds of data collection mechanisms are conventionally configured, for example, in a storage system. In the first kind of data collection mechanism, when a problem occurs in the storage system, maintenance personnel manually perform complete data collection. In the second kind of data collection mechanism, when a new core dump occurs on the storage system, complete data collection is automatically run. In the third kind of data collection mechanism, when a predefined key error occurs in the storage system, partial data collection is automatically run.

However, there are some problems under a conventional data collection mechanism. For example, compared with complete data collection, partial data collection only collects data and logs relevant to specific components, but it is performed after a problem occurs. During manual data collection, the data collection may not be performed in a timely manner. In contrast, when complete data collection is automatically run, if the storage system has a high load and a large number of storage configurations, logs will be refreshed very quickly, and logs near time points when a problem occurs will not be collected in the data collection. In addition, in a case where partial data collection is automatically run, the data collected in the data collection usually only contains simple logs, which may not be enough to complete the problem analysis.

From the experience of testing a storage system, some system problems cannot be solved due to the lack of logs. Full data collection can be simply and periodically run to keep more data collections for later use, but a too short collection interval will affect the system performance and waste the system capacity. A too long collection interval will still cause log loss. Therefore, it is desired to more effectively schedule data collection to improve the performance of a storage system in analyzing problems.

Embodiments of the present disclosure provide techniques for managing a storage system to solve one or more of the above problems and other potential problems. In some embodiments, a plurality of grade ranges are divided for each of a plurality of running parameters of the storage system; relevancies between the running parameter and the plurality of grade ranges are determined; and scheduling of data collection is then determined through the relevancies. In this way, the time for data collection can be dynamically adjusted according to the running of the system. In this way, it can be ensured that relevant data of the storage system is collected in a timely manner, thereby improving the problem analysis and maintenance performance.

Example Environment

Figure 1:
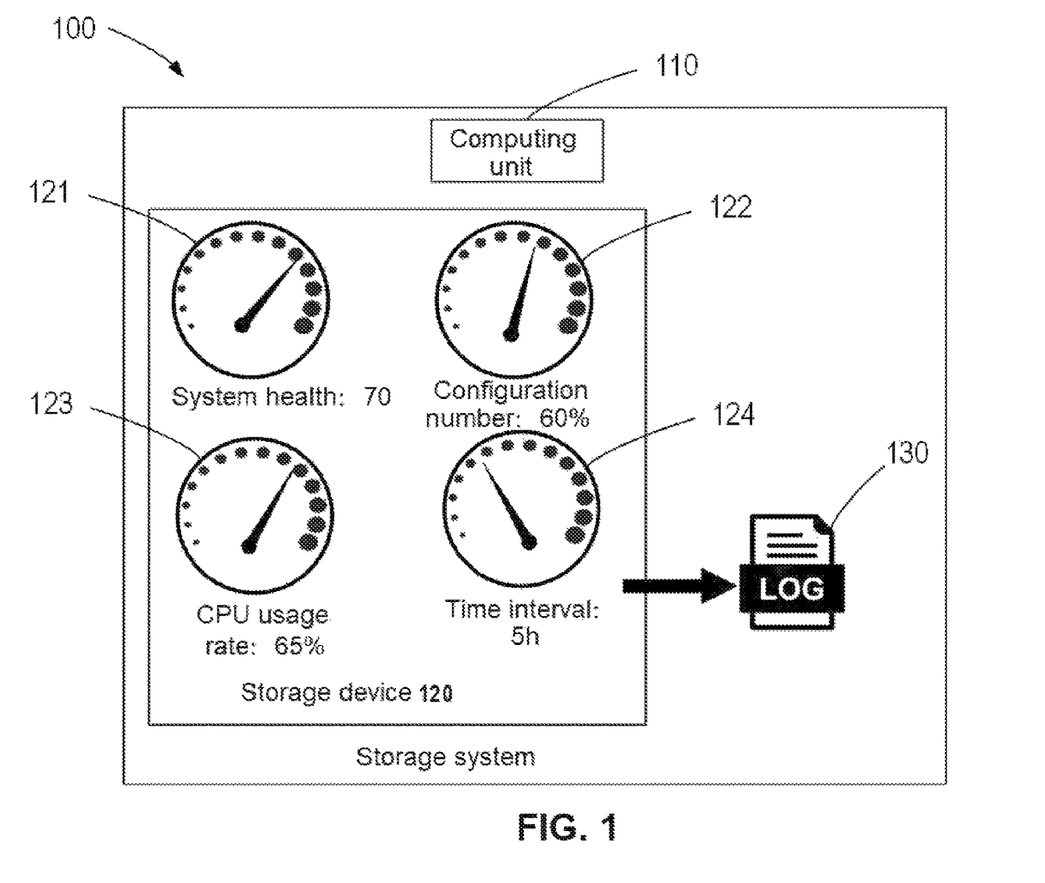
FIG. 1 shows a schematic diagram of a storage system in which an embodiment of the present disclosure can be implemented.

FIG. 1 illustrates a schematic diagram of storage system 100 in which an embodiment of the present disclosure can be implemented. As shown in FIG. 1, storage system 100 generally includes computing unit 110 and storage device 120, such as a volatile storage device, a cache device, and a persistent storage device. It should be understood that the architecture and functions of the environment are described for illustrative purposes only, and do not imply any limitation to the scope of the present disclosure. Embodiments of the present disclosure may also be applied to environments involving data storage systems and having different structures and/or functions.

As shown in FIG. 1, storage device 120 may include various running parameters, such as system health 121, configuration number 122, CPU usage rate 123, and time interval 124 from previous data collection. At the time shown in FIG. 1, system health 121 is, for example, 70 points out of a total score of 100 points; configuration number 122 is 60% of the maximum configuration number; CPU usage rate 123 is 65%; and time interval 124 is 5 hours ("5 h"). The running parameters of storage device 120 may be transmitted to computing unit 110 for computing unit 110 to conduct operational analysis. In addition, computing unit 110 may also schedule data collection for storage device 120, for example, to acquire log 130 of storage device 120.

It should be understood that the running parameters and their values shown here are only illustrative. Storage device 120 may also include other types of running parameters and values in other forms or units. The present disclosure is not intended to limit this. In addition, the data acquired by the data collection may also include other types of data.

Example Method for Scheduling Data Collection

Figure 2:
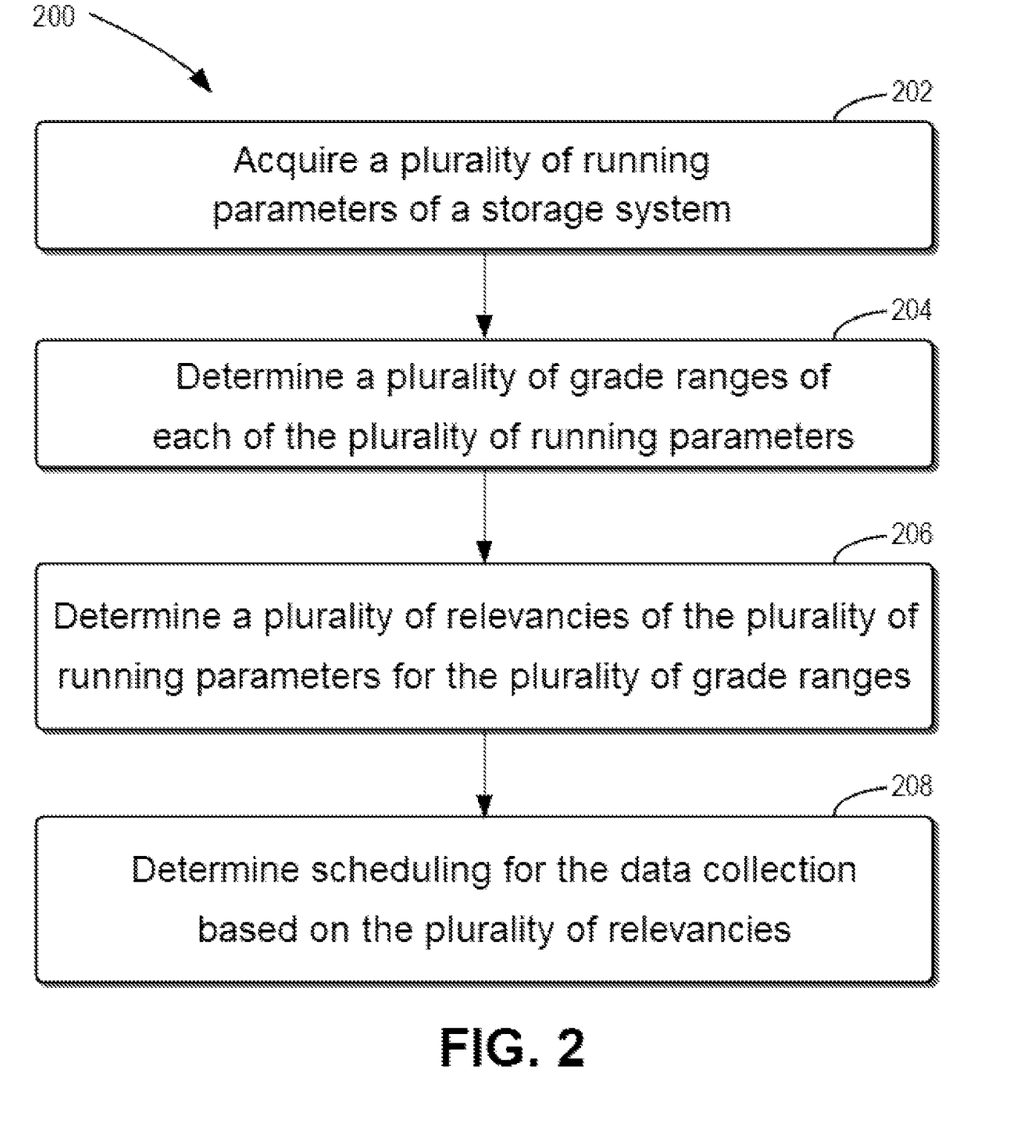
FIG. 2 shows a flow chart of an example method for scheduling data collection according to an embodiment of the present disclosure.

FIG. 2 shows a flow chart of example method 200 for scheduling data collection according to an embodiment of the present disclosure. Method 200 may be performed, for example, by computing unit 110 in FIG. 1.

At 202, computing unit 110 acquires a plurality of running parameters of a storage system. The storage system includes various running parameters, in which a plurality of running parameters relevant to scheduling of data collection can be selected.

In some embodiments, the running parameter may be a health parameter. The health parameter here indicates the number of problems in the storage system or severities of the problems. The health parameter may be obtained, for example, by counting problems that have occurred in the storage system, configuring a weight that represents the severity of each problem according to the type of the problem, and then calculating a weighted sum of all the problems. For example, when the storage system has a system director failure, 30 points will be subtracted from the health parameter with a full score of 100.

In some embodiments, the running parameter may be a pressure parameter. The pressure parameter here is a usage rate of computing resources of the storage system, that is, a usage rate of the CPU of the system. In some embodiments, the running parameter may also be a configuration parameter. The configuration parameter here is a usage rate of storage resources of the storage system. For example, if the maximum number of storage units that the storage system can configure is 1000, and there are 600 storage units currently configured, then a current usage rate, that is, the configuration parameter, is 60%. In addition, the running parameter may be, for example, a time interval parameter. The time interval parameter is a time interval from previous data collection.

At 204, computing unit 110 determines a plurality of grade ranges for each of the plurality of running parameters. The grade ranges here indicate degrees of impact on scheduling for data collection. As discussed above, the acquired running parameters are usually associated with the scheduling of data collection, and values of the running parameters have different impacts on the scheduling of data collection. Therefore, for each running parameter, its value range (that is, a range between its maximum value and its minimum value) can be divided into a plurality of grade ranges representing the degrees of impact on the scheduling of data collection. Table 1 below lists the degrees of impact of different parameters and examples of grade ranges that can be divided.

TABLE 1

Grade ranges of example running parameters

| Parameter | Degree of impact | Grade range |
| --- | --- | --- |
| Health parameter | The worse the system health is, the earlier the data collection time should be. | Bad, Medium, Healthy |
| Pressure parameter | The higher the system pressure is, that is, the higher the CPU usage rate is, the earlier the data collection time should be. | High, Medium, Low |

TABLE 1-continued

Grade ranges of example running parameters

| Parameter | Degree of impact | Grade range |
| --- | --- | --- |
| Configuration parameter | The larger the number of storage units configured in the system is, the earlier the data collection time should be. | Large, Medium, Small |
| Time interval parameter | The longer the time from the latest data collection is, the earlier the data collection time should be. | Long, Medium, Short |

In some embodiments, at least two of the plurality of grade ranges of each running parameter may partially overlap. In some embodiments, every two adjacent grade ranges partially overlap. In such an embodiment, since the grade ranges of the values of the running parameters are not absolute, the degrees of impact of the running parameters on the scheduling of the data collection can be more readily expressed by partially overlapping the grade ranges.

At 206, computing unit 110 determines a plurality of relevancies of the plurality of running parameters for the plurality of grade ranges. The relevancy indicates a relevancy between each running parameter and its relevant grade range. The relevancy here may also be understood as a probability that a running parameter belongs to a corresponding grade range. In an embodiment where the grade ranges partially overlap as described above, a grade range, for example, corresponds to a fuzzy set in a fuzzy logic, and a relevancy may correspond to a membership of a running parameter for one fuzzy set.

In some embodiments, computing unit 110 may acquire a parameter distribution of each of the plurality of grade ranges, and then determine relevancies of the running parameters for each grade range based on the running parameters and the parameter distribution.

At 208, computing unit 110 determines scheduling for the data collection based on the plurality of relevancies. After the plurality of relevancies of each running parameter are determined, the relevancies can be analyzed, and the degree of impact of each running parameter on the scheduling of the data collection, that is, whether to conduct early collection or delayed collection, can be determined. A specific method for determining scheduling of data collection will be described below in detail with reference to FIG. 3.

According to embodiments of the present disclosure, the time for scheduling data collection can be dynamically determined by determining the degrees of impact of the plurality of running parameters of the storage system on the scheduling of the data collection. In this way, by means of dynamically scheduling the data collection, desired data of the storage system can be acquired in a timely manner for later problem analysis and maintenance.

Example Method for Determining an Adjustment Scheme

Figure 3:
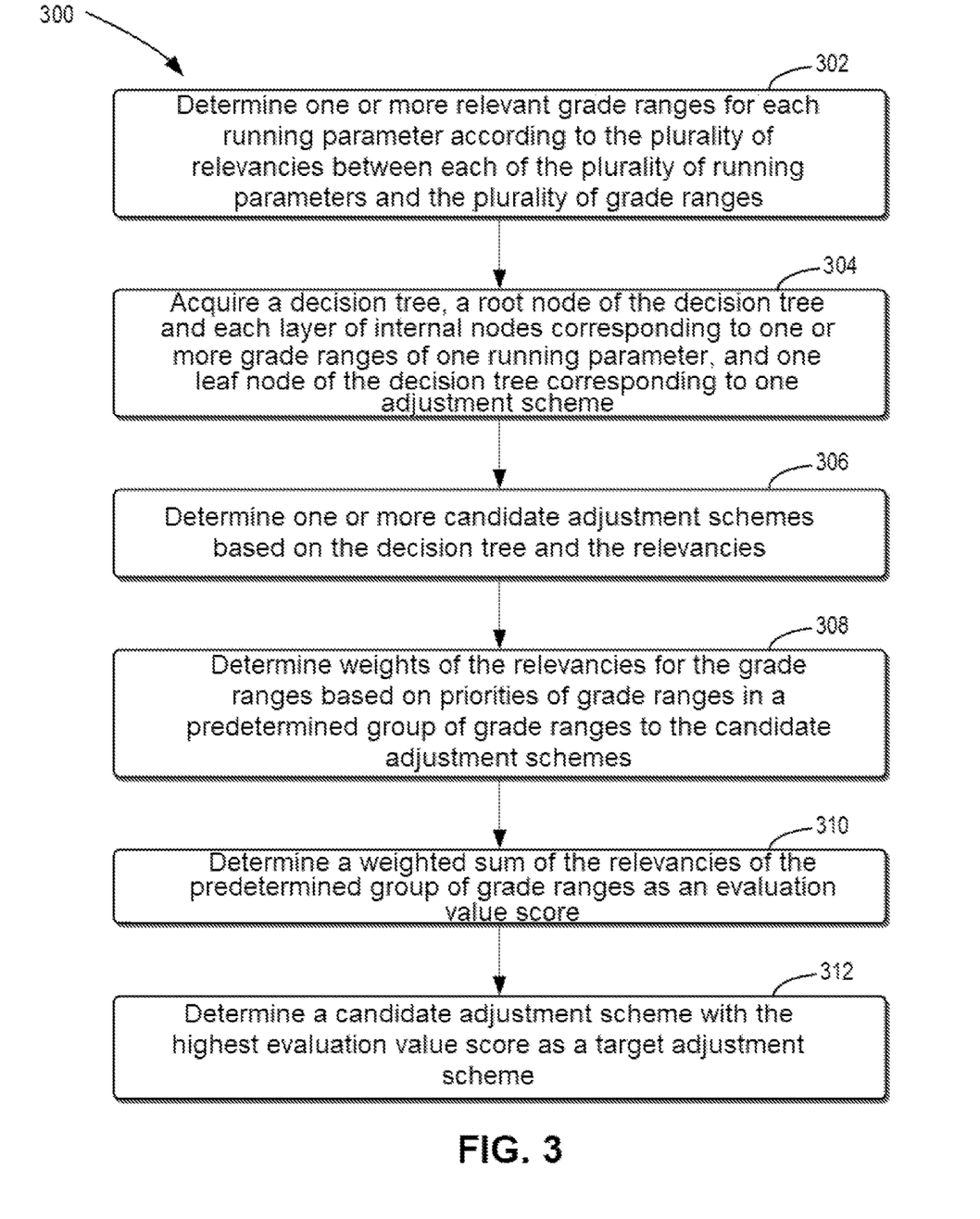
FIG. 3 shows a flow chart of an example method for determining an adjustment scheme according to an embodiment of the present disclosure.

FIG. 3 shows a flow chart of example method 300 for determining an adjustment scheme according to an embodiment of the present disclosure. Method 300 may be performed, for example, by computing unit 110 in FIG. 1. Method 300 is, for example, a specific implementation of step 208 in method 200.

At 302, computing unit 110 determines one or more relevant grade ranges for each running parameter according to the plurality of relevancies between each of the plurality of running parameters and the plurality of grade ranges. For example, computing unit 110 may select a grade range whose relevancy is greater than a predetermined threshold as a relevant grade range for an associated running parameter. In some embodiments, a grade range whose relevancy is zero indicates that the grade range is not relevant to any running parameter, so computing unit 110 may use a grade range whose relevancy is not zero as a relevant grade range.

At 304, computing unit 110 acquires a decision tree. Here, a root node of the decision tree and each layer of internal nodes correspond to one or more grade ranges of one running parameter, and one leaf node of the decision tree corresponds to one adjustment scheme. The adjustment scheme is a specific implementation of the scheduling of the data collection. Generally, the data collection of the storage system is performed at a predetermined time. The adjustment scheme is to perform earlier or later by a certain time with reference to the predetermined time or according to the predetermined time, and the time of adjustment may also be set.

The decision tree is, for example, created previously based on the grade ranges. The running parameter corresponding to the root node of the decision tree is, for example, a running parameter that has the greatest impact on the scheduling of the data collection. Various nodes of each layer may correspond to the grade ranges for one running parameter. Each node may correspond to one grade range or multiple adjacent grade ranges, that is, a union set of multiple grade ranges. A path from the root node to one leaf node includes the grade ranges for each running parameter.

At 306, computing unit 110 determines one or more candidate adjustment schemes based on the decision tree and the relevancies. As mentioned above, a corresponding leaf node can be finally reached by making judgment at each node of the decision tree and selecting a corresponding branch. The adjustment scheme corresponding to the leaf node is a candidate adjustment scheme. Branch selection here may be determined by whether the running parameter it aims at is within the grade range, that is, whether the relevancy between the running parameter and the grade range is greater than zero. In such embodiment, each path from a root node to a leaf node includes the grade ranges for each running parameter, so that the final adjustment scheme is obtained after considering each running parameter. In this way, the comprehensiveness of the candidate adjustment schemes is improved.

At 308, computing unit 110 determines weights of the plurality of relevancies for each of the plurality of running parameters based on the degrees of impact of the plurality of running parameters on the scheduling of the data collection. The weights obtained here are applicable to all the relevancies for the running parameter.

At 310, computing unit 110 determines a weighted sum of the relevancies of the relevant grade ranges corresponding to each of the one or more candidate adjustment schemes as a score. A path, corresponding to each candidate adjustment scheme, in the decision tree includes the relevant grade ranges for each running parameter. Therefore, the score of each candidate adjustment scheme is the weighted sum of the relevancies between each running parameter and the relevant grade ranges.

At 312, computing unit 110 determines the candidate adjustment scheme with the highest score as a target adjustment scheme. Finally, the candidate adjustment scheme with the highest score among the one or more candidate adjustment schemes is determined as the target adjustment scheme for implementation.

In this way, when to perform data collection can be decided based on multiple running parameters reflecting a current state of the storage system through the relevancies between the running parameters and the grade ranges and a preset decision tree. The scheme for scheduling data collection according to the present disclosure will be described below in a specific implementation with reference to FIG. 4 and FIG. 5.

Example Implementation i. Acquire Data

In this example implementation, after a scheduling program is started, current running parameters of the storage system are acquired. This step corresponds to, for example, step 202 of method 200. The acquired running parameters are shown in Table 1, which are a health parameter, a pressure parameter, a configuration parameter, and a time interval parameter, respectively. After four running parameters are acquired, each parameter is standardized, that is, all the parameters are transformed to a range of [0, 1]. For example, it can be performed through the following formula:

$$x_i = \frac{x_i - \min}{\max - \min} \quad (1)$$

where $x_i$ is a running parameter; min is a minimum value of $x_i$ that can be obtained; and max is a maximum value of $x_i$ that can be obtained. As such, the running parameters within all the value ranges can be transformed into a uniform measure for subsequent comparison, and computation can be simplified.

In this implementation, if a health value acquired from the system is 63.5, and its value range is [0, 100], then a health parameter obtained is 0.635. The pressure parameter is, for example, obtained based on an average usage rate within a predetermined time period, and its own value range is [0,1], so no transformation is required. The pressure parameter here is 45%, i.e., 0.45. The configuration parameter is a ratio of the number of configured storage units to the total number of storage units that can be configured. At this time, if the ratio of the two is, for example, 0.67, the configuration parameter is 0.67. The time interval parameter is a ratio of a time interval from previous data collection to a predetermined time interval. For example, if the predetermined time interval for performing data collection is 24 h, and the time interval from previous implementation is 15.84 h, then the time interval parameter is 0.66. At this point, all the running parameters have been acquired.

ii. Fuzzify Data

After the running parameters are acquired, it is necessary to fuzzify the various running parameters, that is, to divide the value ranges of the running parameters into a plurality of fuzzy sets (corresponding to the grade ranges), and calculate a membership of each running parameter to the various fuzzy sets. The process of fuzzifying data will be described in detail below with reference to FIG. 4.

Figure 4:
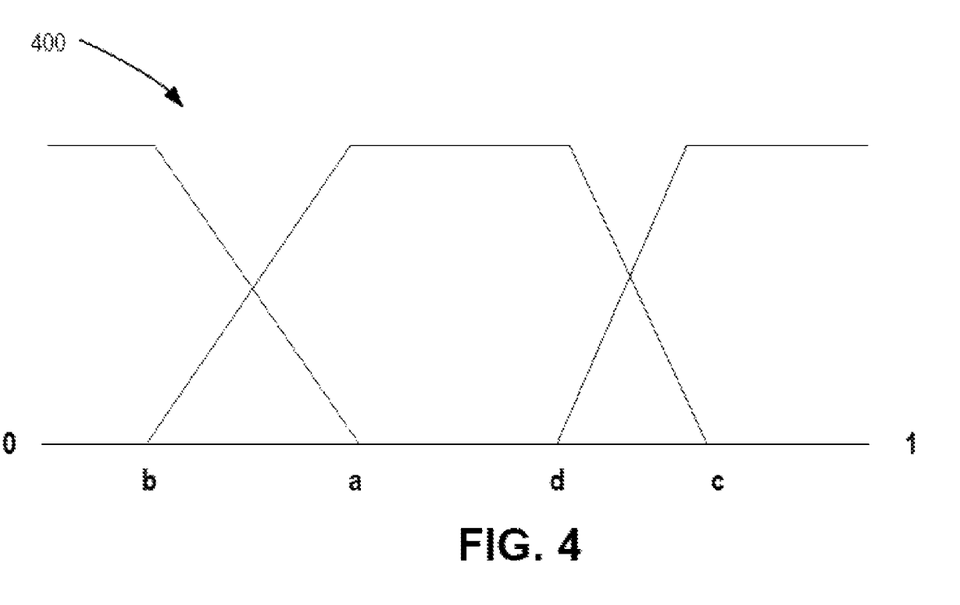
FIG. 4 shows a schematic diagram of a grade range of a running parameter according to an embodiment of the present disclosure.

After the foregoing data standardization, the value ranges of all the running parameters are transformed to [0, 1]. Each running parameter is divided into three fuzzy sets, i.e., three grade ranges, based on the size of each running parameter and the degree of impact on the scheduling of the data collection. This step corresponds, for example, to step 204 of method 200. FIG. 4 shows a schematic diagram of grade range 400 of a running parameter according to an embodiment of the present disclosure. As shown in FIG. 4, a value range of a running parameter is divided into first grade range [0, a], second grade range [b, c], and third grade range [d, 1]. Here, for the purpose of simplifying the process without losing the generality, the grade ranges of the four running parameters are divided at the same interval. It can be seen that the first grade range and the second grade range have an overlapping range [b, a], and the second grade range and the third grade range have an overlapping range [d, c].

After the fuzzy sets are set, a membership of the running parameter to each fuzzy set, that is, to each grade range, is calculated based on a membership function. This step corresponds, for example, to step 206 of method 200.

The following linear function is used as the membership function.

$$\mu_1(x) = \begin{cases} 1 & \text{For } x \leq b \\ (a-x)/(a-b) & \text{For } b \leq x \leq a \\ 0 & \text{For } x \geq a \end{cases} \quad (2)$$

$$\mu_2(x) = \begin{cases} 0 & \text{For } x \leq b \\ (x-b)/(a-b) & \text{For } b \leq x \leq a \\ 1 & \text{For } a \leq x \leq d \\ (c-x)/(c-d) & \text{For } d \leq x \leq c \\ 0 & \text{For } x \geq c \end{cases} \quad (3)$$

$$\mu_3(x) = \begin{cases} 0 & \text{For } x \leq d \\ (x-d)/(c-d) & \text{For } d \leq x \leq c \\ 1 & \text{For } x \geq c \end{cases} \quad (4)$$

where $\mu_1$ (x) is a membership (corresponding to the relevancy) of the running parameter to the first grade range; $\mu_2$ (x) is a membership of the running parameter to the second grade range; and $\mu_3$ (x) is a membership of the running parameter to the third grade range.

Here, b is set to be 0.3; a is set to be 0.5; d is set to be 0.6; and c is set to be 0.7. Therefore, corresponding membership functions are obtained:

$$\mu_1(x) = \begin{cases} 1 & \text{For } x \leq 0.3 \\ (0.5-x)/(0.5-0.3) & \text{For } 0.3 \leq x \leq 0.5 \\ 0 & \text{For } x \geq 0.5 \end{cases} \quad (5)$$

$$\mu_2(x) = \begin{cases} 0 & \text{For } x \leq 0.3 \\ (x-0.3)/(0.5-0.3) & \text{For } 0.3 \leq x \leq 0.5 \\ 1 & \text{For } 0.5 \leq x \leq 0.6 \\ (0.7-x)/(0.7-0.6) & \text{For } 0.6 \leq x \leq 0.7 \\ 0 & \text{For } x \geq 0.7 \end{cases} \quad (6)$$

$$\mu_3(x) = \begin{cases} 0 & \text{For } x \leq 0.6 \\ (x-0.6)/(0.7-0.6) & \text{For } 0.6 \leq x \leq 0.7 \\ 1 & \text{For } x \geq 0.7 \end{cases} \quad (7)$$

Here, the health parameter of 0.635, the pressure parameter of 0.45, the configuration parameter of 0.67, and the time interval parameter of 0.66 are substituted into formulas (5), (6), and (7) respectively. The memberships of the health parameter to the first grade range, the second grade range, and the third grade range are 0, 0.65, and 0.35, respectively. The memberships of the pressure parameter to the first grade range, the second grade range, and the third grade range are 0.25, 0.75, and 0, respectively. The memberships of the configuration parameter to the first grade range, the second grade range, and the third grade range are 0, 0.3, and 0.7, respectively. The memberships of the time interval parameter to the first grade range, the second grade range, and the third grade range are 0, 0.4, and 0.6, respectively. At this point, the memberships of all the running parameters have been obtained. A decision-making process based on memberships will be described in detail below with reference to FIG. 5.

iii. Create a Decision Tree

Figure 5:
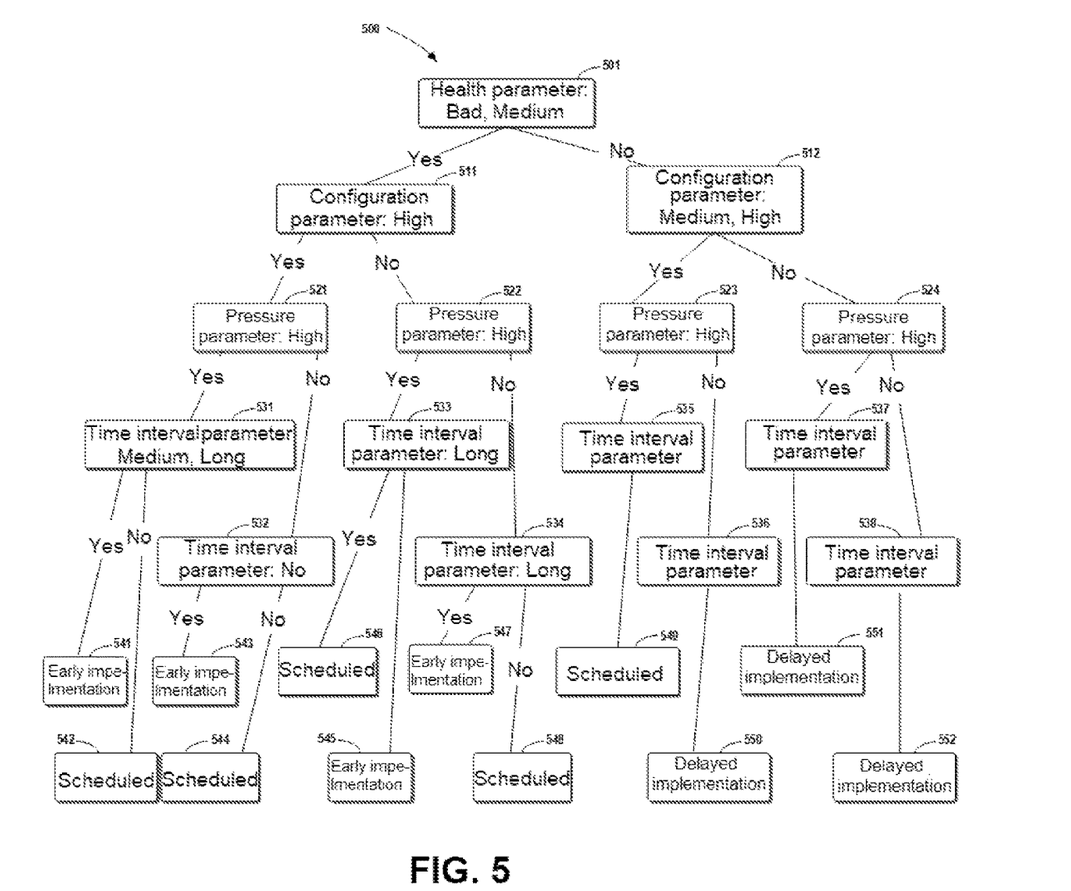
FIG. 5 shows a schematic diagram of an example decision tree according to an embodiment of the present disclosure.

After the running parameters are fuzzified, it is also necessary to determine the relevancies between the running parameters and the scheduling of the data collection. A decision tree is used here to make decisions. FIG. 5 shows a schematic diagram of example decision tree 500 according to an embodiment of the present disclosure. The first grade range of the health parameter corresponds to "Bad." The second grade range of the health parameter corresponds to "Medium." The third grade range of the health parameter corresponds to "Healthy." The first grade range of the pressure parameter corresponds to "Low." The second grade range of the pressure parameter corresponds to "Medium." The third grade range of the pressure parameter corresponds to "High." The first grade range of the configuration parameter corresponds to "Low." The second grade range of the configuration parameter corresponds to "Medium." The third grade range of the configuration parameter corresponds to "High." The first grade range of the time interval parameter corresponds to "Short." The second grade range of the time interval parameter corresponds to "Medium." The third grade range of the time interval parameter corresponds to "Long." For each node, if a corresponding running parameter is within a range corresponding to the node, branch "Yes" is selected, and on the contrary, branch "No" is selected.

As shown in FIG. 5, root node 501 of decision tree 500 corresponds to a union set of the first grade range and the second grade range of the health parameter.

Internal nodes 511 and 512 at the second layer of decision tree 500 correspond to the configuration parameter. Internal node 511 corresponds to the third grade range of the configuration parameter, and internal node 512 corresponds to a union set of the second and third grade ranges of the configuration parameter. Internal nodes 521, 522, 523, and 524 of the third layer of decision tree 500 correspond to the pressure parameter, and all correspond to the third grade range of the pressure parameter. Internal nodes 531, 532, 533, 534, 535, 536, 537, and 538 of the fourth layer of decision tree 500 correspond to the time interval parameter. Internal node 531 corresponds to a union set of the second and third grade ranges of the time interval parameter. Internal nodes 532, 533, and 534 correspond to the third grade range of the time interval parameter. Internal nodes 535, 536, 537, and 538 correspond to all the ranges of the time interval parameter, that is, there are no branches in internal nodes 535, 536, 537, and 538. Finally, the last layer of decision tree 500 is leaf nodes. The leaf nodes correspond to adjustment schemes 541, 542, 543, 544, 545, 546, 547, 548, 549, 550, 551, and 552. Adjustment schemes 541, 543, 545, and 547 correspond to early implementation. Adjustment schemes 542, 544, 546, 548, and 549 correspond to scheduled implementation. Adjustment schemes 550, 551, and 552 correspond to delayed implementation.

The memberships of the health parameter are 0, 0.65, and 0.35, respectively. Therefore, the health parameter is also regarded as belonging to the range corresponding to root node 501, and also regarded as not belonging to the range corresponding to root node 501. Thus, at root node 501, both branches are selected. In a similar way, the following five paths can be determined (i.e., five candidate adjustment schemes can be obtained) through the current memberships of all the running parameters:

(1) The memberships corresponding to root node 501-internal node 511-internal node 521-internal node 531-leaf node 541 are 0.65, 0.7, 0.75, and 0.6, respectively, and the corresponding adjustment schemes are early implementation.

(2) The memberships corresponding to root node 501-internal node 511-internal node 522-internal node 533-leaf node 545 are 0.65, 0.3, 0.75, and 0.6, respectively, and the corresponding adjustment schemes are early implementation.

(3) The memberships corresponding to root node 501-internal node 511-internal node 522-internal node 533-leaf node 546 are 0.65, 0.7, 0.75, and 0.4, respectively, and the corresponding adjustment schemes are scheduled implementation.

(4) The memberships corresponding to root node 501-internal node 512-internal node 523-internal node 535-leaf node 549 are 0.35, 0.7, 0.75, and 0.6, respectively, and the corresponding adjustment schemes are scheduled implementation.

(5) The memberships corresponding to root node 501-internal node 512-internal node 523-internal node 536-leaf node 550 are 0.35, 0.7, 0.25, and 0.4, respectively, and the corresponding adjustment schemes are early implementation.

On this basis, the following three adjustment schemes are obtained according to the maximum membership principle:

1. The memberships corresponding to early implementation are: 0.65, 0.7, 0.75, and 0.6;
2. The memberships corresponding to scheduled implementation are: 0.35, 0.7, 0.75, and 0.6; and
3. The memberships corresponding to delayed implementation are: 0.35, 0.7, 0.25, and 0.4.

iv. Perform Defuzzification

In the above steps, the three adjustment schemes are finally obtained. In order to obtain an optimal scheme, defuzzification will be performed. First, a weight of each running parameter needs to be determined. This step corresponds, for example, to step 308 in method 300. A determining matrix is determined based on a relative importance between the following parameters:

TABLE 2

Relative importance between parameters interval

|  | Health parameter | Configuration parameter | Pressure parameter | Time interval parameter |
|---|---|---|---|---|
| Health parameter | 1 | 5 | 7 | 1/3 |
| Configuration parameter | 1/5 | 1 | 5 | 1 |
| Pressure parameter | 1/7 | 1/5 | 1 | 1/2 |
| Time interval parameter | 3 | 1 | 2 | 1 |

A data item in the table represents an importance between two corresponding parameters. For example, 1 means that two parameters are equally important; 3 means that one parameter is slightly more important than the other parameter; 5 means that one parameter is significantly more important than the other parameter; 7 means that one parameter is much more important than the other parameter; and 2 is a median of 1 and 3.

The determining matrix can be obtained from the relationships in Table 2:

$$A = \begin{bmatrix} 1 & 5 & 7 & 1/3 \\ 1/5 & 1 & 5 & 1 \\ 1/7 & 1/5 & 1 & 1/2 \\ 3 & 1 & 2 & 1 \end{bmatrix}.$$

Then, a geometric mean of each row vector of matrix A is calculated (by the square root method) and is normalized, thus obtaining the weight of each running parameter, that is, weight $w_H=0.3884$ of the health parameter, weight $w_C=0.2101$ of the configuration parameter, weight $w_P=0.0726$ of the pressure parameter; and weight $w_T=0.3289$ of the time interval parameter. Finally, a weighted sum of the memberships of each adjustment scheme is calculated based on the obtained weights, thus obtaining: the score for early implementation is 0.65132, the score for scheduled implementation is 0.5348, and the score for delayed implementation is 0.43272. By means of comparing the scores, the target adjustment scheme can be selected as the early implementation with the highest score.

It should be understood that numerical values described herein are merely examples and not intended to limit the scope of the present disclosure. Different determining matrices, endpoint values of the grade ranges, and any specific values that appear herein can be set according to specific application scenarios.

Figure 6:
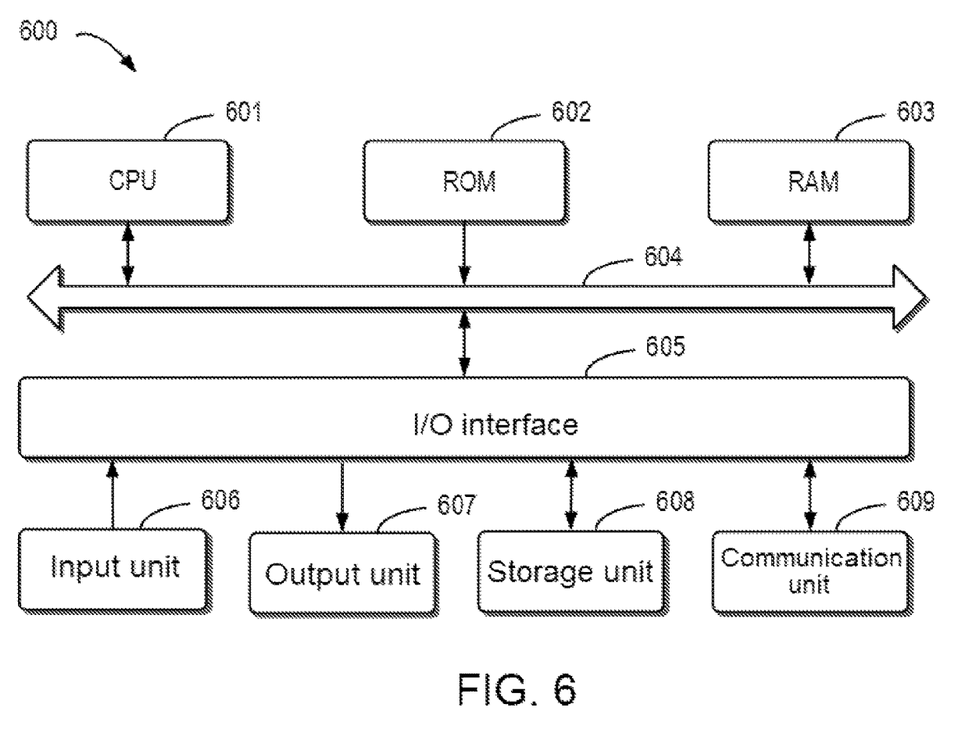
FIG. 6 is a block diagram of an example device that can be used for implementing embodiments of the present disclosure.

FIG. 6 is a schematic block diagram of example device 600 that can be used to implement embodiments of the present disclosure. As shown in FIG. 6, device 600 includes central processing unit (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

The various processes and processing described above, such as method 200 and method 300, may be performed by CPU 601. For example, in some embodiments, methods 200 and 300 may be implemented as a computer software program that is tangibly included in a machine-readable medium such as storage unit 608. In some embodiments, part of or all the computer program may be loaded and/or installed onto device 600 via ROM 602 and/or communication unit 609. When the computer program is loaded to RAM 603 and executed by CPU 601, one or more actions of methods 200 and 300 described above may be executed.

Embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flowcharts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms used herein is intended to best explain the principles and practical applications of the various embodiments and their associated improvements, so as to enable persons of ordinary skill in the art to understand the embodiments disclosed herein.

What is claimed is:

1. A method for scheduling data collection, comprising:
    acquiring a plurality of running parameters of a storage system;
    determining a plurality of grade ranges of each of the plurality of running parameters, the grade ranges indicating degrees of impact on scheduling for the data collection;
    determining a plurality of relevancies of the plurality of running parameters for the plurality of grade ranges; and
    determining scheduling for the data collection based on the plurality of relevancies;
    wherein determining scheduling for the data collection comprises:
    determining one or more relevant grade ranges for each running parameter according to the plurality of relevancies between each of the plurality of running parameters and the plurality of grade ranges;
    determining one or more candidate adjustment schemes based on the one or more relevant grade ranges for each running parameter; and
    determining a target adjustment scheme from the one or more candidate adjustment schemes based on the plurality of relevancies.

2. The method according to claim 1, wherein acquiring the plurality of running parameters of the storage system comprises:
    acquiring at least two of the following running parameters:
    a health parameter, indicating the number or degree of problems in the storage system;
    a pressure parameter, indicating a usage rate of computing resources of the storage system;
    a configuration parameter, indicating a usage rate of storage resources of the storage system; and
    a time interval parameter, indicating a time interval from previous data collection.

3. The method according to claim 1, wherein determining the plurality of relevancies comprises:
    acquiring a parameter distribution of each of the plurality of grade ranges; and
    determining the relevancies of the running parameters for each grade range based on the running parameters and the parameter distribution.

4. The method according to claim 1, wherein determining the target adjustment scheme comprises:
    determining a score of each candidate adjustment scheme based on the relevancy of the relevant grade range corresponding to each of the one or more candidate adjustment schemes; and
    determining the candidate adjustment scheme with the highest score as the target adjustment scheme.

5. The method according to claim 4, wherein determining the score of the candidate adjustment scheme comprises:
    determining weights of the plurality of relevancies for each of the plurality of running parameters based on degrees of impact of the plurality of running parameters on the scheduling of the data collection; and
    determining a weighted sum of the relevancies of the relevant grade ranges corresponding to each of the one or more candidate adjustment schemes as the score.

6. The method according to claim 1, wherein at least two of the plurality of grade ranges of each running parameter partially overlap.

7. A method for scheduling data collection, comprising:
acquiring a plurality of running parameters of a storage system;
determining a plurality of grade ranges of each of the plurality of running parameters, the grade ranges indicating degrees of impact on scheduling for the data collection;
determining a plurality of relevancies of the plurality of running parameters for the plurality of grade ranges; and
determining scheduling for the data collection based on the plurality of relevancies;
wherein determining scheduling for the data collection comprises:
acquiring a decision tree, a root node of the decision tree and each layer of internal nodes corresponding to one or more grade ranges of one running parameter, and one leaf node of the decision tree corresponding to one adjustment scheme; and
determining a target adjustment scheme based on the decision tree and the relevancies.

8. An electronic device, comprising:
at least one processor; and
a memory coupled to the at least one processor, wherein the memory has instructions stored therein which, when executed by the at least one processor, cause the electronic device to execute actions comprising:
acquiring a plurality of running parameters of a storage system;
determining a plurality of grade ranges of each of the plurality of running parameters, the grade ranges indicating degrees of impact on scheduling for data collection;
determining a plurality of relevancies of the plurality of running parameters for the plurality of grade ranges; and
determining scheduling for the data collection based on the plurality of relevancies;
wherein determining scheduling for the data collection comprises:
determining one or more relevant grade ranges for each running parameter according to the plurality of relevancies between each of the plurality of running parameters and the plurality of grade ranges;
determining one or more candidate adjustment schemes based on the one or more relevant grade ranges for each running parameter; and
determining a target adjustment scheme from the one or more candidate adjustment schemes based on the plurality of relevancies.

9. The electronic device according to claim 8, wherein acquiring the plurality of running parameters of the storage system comprises:
acquiring at least two of the following running parameters:
a health parameter, indicating the number or degree of problems in the storage system;
a pressure parameter, indicating a usage rate of computing resources of the storage system;
a configuration parameter, indicating a usage rate of storage resources of the storage system; and
a time interval parameter, indicating a time interval from previous data collection.

10. The electronic device according to claim 8, wherein determining the plurality of relevancies comprises:
acquiring a parameter distribution of each of the plurality of grade ranges; and
determining the relevancies of the running parameters for each grade range based on the running parameters and the parameter distribution.

11. The electronic device according to claim 8, wherein determining the one or more candidate adjustment schemes comprises:
acquiring a decision tree, a root node of the decision tree and each layer of internal nodes corresponding to one or more grade ranges of one running parameter, and one leaf node of the decision tree corresponding to one adjustment scheme; and
determining the one or more candidate adjustment schemes based on the decision tree and the relevancies.

12. The electronic device according to claim 8, wherein determining the target adjustment scheme comprises:
determining a score of each candidate adjustment scheme based on the relevancy of the relevant grade range corresponding to each of the one or more candidate adjustment schemes; and
determining the candidate adjustment scheme with the highest score as the target adjustment scheme.

13. The electronic device according to claim 12, wherein determining the score of the candidate adjustment scheme comprises:
determining weights of the plurality of relevancies for each of the plurality of running parameters based on degrees of impact of the plurality of running parameters on the scheduling of the data collection; and
determining a weighted sum of the relevancies of the relevant grade ranges corresponding to each of the one or more candidate adjustment schemes as the score.

14. The electronic device according to claim 8, wherein at least two of the plurality of grade ranges of each running parameter partially overlap.

15. A computer program product tangibly stored on a non-transitory computer-readable medium and comprising machine-executable instructions, wherein the machine-executable instructions, when executed by a machine, cause the machine to perform a method for scheduling data collection, the method comprising:
acquiring a plurality of running parameters of a storage system;
determining a plurality of grade ranges of each of the plurality of running parameters, the grade ranges indicating degrees of impact on scheduling for the data collection;
determining a plurality of relevancies of the plurality of running parameters for the plurality of grade ranges; and
determining scheduling for the data collection based on the plurality of relevancies;
wherein determining scheduling for the data collection comprises:
determining one or more relevant grade ranges for each running parameter according to the plurality of relevancies between each of the plurality of running parameters and the plurality of grade ranges;
determining one or more candidate adjustment schemes based on the one or more relevant grade ranges for each running parameter; and
determining a target adjustment scheme from the one or more candidate adjustment schemes based on the plurality of relevancies.

16. The computer program product according to claim 15, wherein acquiring the plurality of running parameters of the storage system comprises:
- acquiring at least two of the following running parameters:
- a health parameter, indicating the number or degree of problems in the storage system;
- a pressure parameter, indicating a usage rate of computing resources of the storage system;
- a configuration parameter, indicating a usage rate of storage resources of the storage system; and
- a time interval parameter, indicating a time interval from previous data collection.

17. The computer program product according to claim 15, wherein determining the plurality of relevancies comprises:
- acquiring a parameter distribution of each of the plurality of grade ranges; and
- determining the relevancies of the running parameters for each grade range based on the running parameters and the parameter distribution.

18. The computer program product according to claim 15, wherein determining the one or more candidate adjustment schemes comprises:
- acquiring a decision tree, a root node of the decision tree and each layer of internal nodes corresponding to one or more grade ranges of one running parameter, and one leaf node of the decision tree corresponding to one adjustment scheme; and
- determining the one or more candidate adjustment schemes based on the decision tree and the relevancies.

19. The computer program product according to claim 15, wherein determining the target adjustment scheme comprises:
- determining a score of each candidate adjustment scheme based on the relevancy of the relevant grade range corresponding to each of the one or more candidate adjustment schemes; and
- determining the candidate adjustment scheme with the highest score as the target adjustment scheme.

20. The computer program product according to claim 19, wherein determining the score of the candidate adjustment scheme comprises:
- determining weights of the plurality of relevancies for each of the plurality of running parameters based on degrees of impact of the plurality of running parameters on the scheduling of the data collection; and
- determining a weighted sum of the relevancies of the relevant grade ranges corresponding to each of the one or more candidate adjustment schemes as the score.

\* \* \* \* \*